No. 675,285. Patented May 28, 1901.
P. F. MEENAN.
NUT LOCK.
Application filed Nov. 12, 1900.
(No Model.)
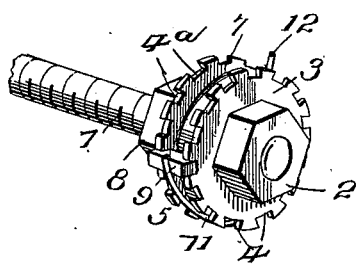
Fig. 1.
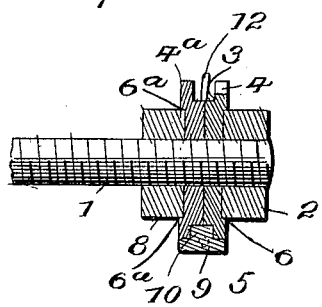
Fig. 2.
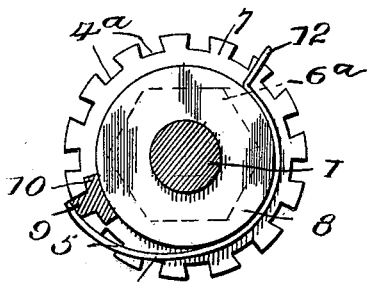
Fig. 3.
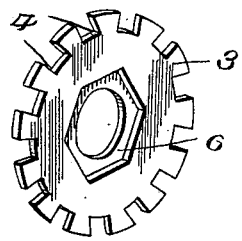
Fig. 4.
Fig. 5.
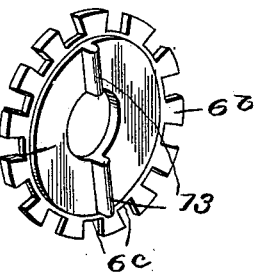
Fig. 6.
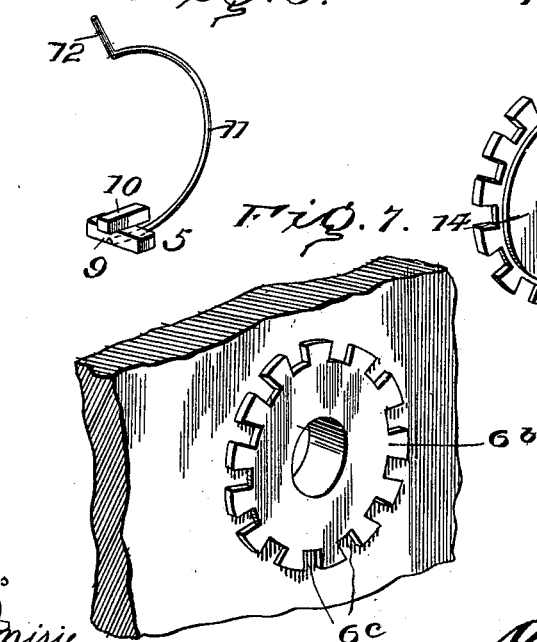
Fig. 7.
Witnesses
Jno. Mirie.
Gladys L. Thompson
Inventor
Peter F. Meenan
By R. S. & A. B. Lacey
Attorneys

UNITED STATES PATENT OFFICE.

PETER F. MEENAN, OF RIDGWAY, PENNSYLVANIA.

NUT-LOCK.

SPECIFICATION forming part of Letters Patent No. 675,285, dated May 28, 1901.

Application filed November 12, 1900. Serial No. 36,310. (No model.)

*To all whom it may concern:*

Be it known that I, PETER F. MEENAN, a citizen of the United States, residing at Ridgway, in the county of Elk and State of Pennsylvania, have invented certain new and useful Improvements in Nut-Locks; and I do hereby declare the following to be a full, clear, and exact description of the invention, such as will enable others skilled in the art to which it appertains to make and use the same.

This invention relates to nut-locks, and has for its object to provide a securing means for use in connection with bolts and kindred fastenings to prevent the casual displacement of the nut when tightened and yet admit of the nut being tightened, loosened, removed, and replaced as often as desired without injury to either the nut, the bolt, or the fastening means.

For a full description of the invention and the merits thereof and also to acquire a knowledge of the details of construction of the means for effecting the result reference is to be had to the following description and drawings hereto attached.

While the essential and characteristic features of the invention are necessarily susceptible of modification, still the preferred embodiment of the invention is illustrated in the accompanying drawings, in which—

Figure 1 is a perspective view showing the invention applied in connection with a pair of nuts. Fig. 2 is a sectional detail. Fig. 3 is a section on the line X X of Fig. 2. Fig. 4 is a detail perspective view of the lock-washer. Fig. 5 is a detail perspective view of the locking-dog and spring. Fig. 6 is a detail view of a base-washer. Fig. 7 is a detail view of a plate having the circular series of cogs formed therewith.

Corresponding and like parts are referred to in the following description and indicated in all the views of the drawings by the same reference characters.

The invention is so constructed as to be used in connection with any type of bolt without requiring any special provision for its adaptation thereto, and, as shown, the bolt 1 and nut 2 are of common construction, being selected to illustrate the application of the invention. The lock-washer 3 is constructed so as to move with the nut 2, or may form a part thereof, and is provided around its periphery with a series of notches 4, adapted to coöperate with a locking-dog 5, whereby the parts are secured against casual movement when located in the desired position. In the preferable construction the lock-washer 3 is formed with a central depression 6 to receive the nut 2 and prevent relative turning of the parts when the nut is seated therein. A companion washer 7 is adapted to be slipped upon the bolt 1 and is the duplicate in construction of the washer 3, being formed with peripheral notches 4$^a$ and a central depression 6$^a$ to receive the inner nut 8. The notches formed in the peripheral portion of the washers are preferably irregularly spaced, so as to insure registry of corresponding notches at some point in the circumferential length of the washers after the nuts 2 and 8 have been screwed up tight. This is essential in order to provide corresponding seats for the locking-dog 5, whereby the washers and nuts are prevented from independent movement when tightened and locked.

The locking-dog consists of a transverse member 9 and a longitudinal member 10, the two members being relatively disposed at a right angle and in different planes. The longitudinal member 10 comes between the spaced peripheral portions of the washers, and the transverse member is adapted to have its end portions seated in the corresponding and registering notches. The inner or opposing central portion of the washers is raised for the twofold purpose of spacing the peripheral portions and to provide for the depressions 6 and 6$^a$. The locking-dog is held in place by means of a spring 11, curved to conform approximately to the raised central portion of the washers. This spring 11 is greater than a semicircle, so as to embrace opposite portions of the central part of the washers and retain itself and the locking-dog in place. One end of the spring is rigidly attached to the central portion of the dog, and its opposite end is bent outward, as shown at 12, to form a finger-grip to facilitate the engagement and the disengagement of the spring from the washers. The spring is protected by the notched peripheral portions of the washers between which it is located.

The foregoing-described construction of the locking means is specially adapted for a bolt provided with two nuts to be secured against relative movement. When a single nut is to be held against accidental turning, the companion washer, as 6ᵇ, is formed on its rear side with spurs or projections 13 to enter notches formed in a metallic surface, against which the said washer may be placed, or to become embedded in a surface susceptible of compression by the application of sufficient force against the washer 6ᵇ to cause the parts 13 to penetrate the material to which the bolt may be fitted. In special work, as in bridge construction or parts of machinery, the companion washer may be dispensed with or formed with the part to be clamped, and in such construction a raised portion 14 will be provided around the bolt-opening and will be formed in its periphery with notches 6ᶜ, corresponding to the notches in the peripheral portion of the companion washer herein referred to and replaced thereby.

The washers or their equivalent parts constitute locking elements, with which the locking-dog 5 coöperates, and the notches in the peripheral portions of the said locking elements form in effect circular series of cogs, the spaces between which are adapted to receive the end portions of the locking-dog in the manner and for the purpose aforesaid.

Having thus described the invention, what is claimed as new is—

1. In combination with a bolt and a nut threaded thereon, an inner circular series of irregular-spaced cogs, a washer having its peripheral portion notched at irregular intervals to form a corresponding circular series of cogs and constructed to prevent independent movement of the aforesaid nut, and a locking-dog separate from and adapted to be fitted in the registering spaces formed between adjacent cogs of the nut and washer to prevent casual turning of the nut when screwed home, substantially as set forth.

2. In combination with a bolt and a nut threaded thereon, a circular series of cogs coöperating with the nut, a corresponding circular series of cogs coöperating with the part against which the nut is turned and clamped by the bolt, the cogs being irregularly spaced to insure registry of the spaces between some one of the two series when the nut is screwed home, a locking-dog adapted to be seated in the said registering spaces, and a fastening-spring for holding the locking-dog in position, substantially as set forth.

3. In a nut-lock comprising two circular series of cogs spaced apart, a shiftable locking-dog comprising two members right-angularly disposed and in different planes, one member adapted to lie in the space formed between the two sets of cogs and the other member adapted to have its end portions engage with corresponding cogs of the two series, and a spring for holding the locking-dog in place, substantially as specified.

4. In a nut-lock, and in combination with two sets of circularly-disposed cogs spaced apart, a locking-dog composed of two members in different planes and relatively at right angles to each other, and a spring greater than a semicircle and having one end secured to the locking-dog and its opposite end bent upward to provide a finger-grip, substantially as set forth.

5. In a nut-lock, an inner circular series of cogs, a washer having a central depression to receive the nut and provided with a notched peripheral portion forming a corresponding circular series of cogs, and a locking-dog adapted to have its end portions interlock with the two sets of cogs, substantially as and for the purpose specified.

In testimony whereof I affix my signature in presence of two witnesses.

PETER F. MEENAN. [L. S.]

Witnesses:
R. E. McFARLAND,
L. J. A. LESSER.